United States Patent
Chun et al.

(10) Patent No.: US 11,184,834 B2
(45) Date of Patent: Nov. 23, 2021

(54) METHOD FOR ACCESS CONTROL USING RELAY UE AND APPARATUS THEREFOR

(71) Applicant: LG ELECTRONICS INC., Seoul (KR)

(72) Inventors: Sungduck Chun, Seoul (KR); Jaehyun Kim, Seoul (KR); Ki-Dong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 342 days.

(21) Appl. No.: 16/323,772

(22) PCT Filed: Aug. 8, 2017

(86) PCT No.: PCT/KR2017/008527
§ 371 (c)(1),
(2) Date: Feb. 6, 2019

(87) PCT Pub. No.: WO2018/030741
PCT Pub. Date: Feb. 15, 2018

(65) Prior Publication Data
US 2019/0182747 A1    Jun. 13, 2019

Related U.S. Application Data

(60) Provisional application No. 62/371,839, filed on Aug. 8, 2016.

(51) Int. Cl.
*H04W 48/02* (2009.01)
*H04W 48/08* (2009.01)
(Continued)

(52) U.S. Cl.
CPC ........... *H04W 48/02* (2013.01); *H04W 40/22* (2013.01); *H04W 48/08* (2013.01); *H04W 76/18* (2018.02);
(Continued)

(58) Field of Classification Search
None
See application file for complete search history.

(56) References Cited

U.S. PATENT DOCUMENTS

| 2013/0273907 A1 | 10/2013 | Vikberg et al. |
| 2015/0119049 A1* | 4/2015 | Isobe .................... H04W 76/14 455/445 |

(Continued)

FOREIGN PATENT DOCUMENTS

| CN | 103906266 | 7/2014 |
| EP | 3422797 | 1/2019 |

(Continued)

OTHER PUBLICATIONS

ZTE, "Considerations on teh UE-to-Network Relays", Apr. 20-24, 2015, 3GPP TSG RAN WG2 #89bis, pp. 1-7 (Year: 2015).*

(Continued)

*Primary Examiner* — Steve R Young
(74) *Attorney, Agent, or Firm* — Lee, Hong, Degerman, Kang & Waimey

(57) ABSTRACT

Disclosed is a method for controlling access of a remote UE to a base station, using a relay UE. Particularly, the method comprises receiving access control information through a second terminal, and determining, on the basis of the access control information, whether to perform an access control check for user data according to whether the user data is data to which an access control scheme allowed in an indirect connection mode is applied, wherein the access control information includes information on an access control scheme which is allowed or not allowed in an indirect connection mode.

11 Claims, 17 Drawing Sheets

(51) Int. Cl.
*H04W 88/04* (2009.01)
*H04W 76/18* (2018.01)
*H04W 40/22* (2009.01)
*H04W 76/27* (2018.01)
*H04W 8/00* (2009.01)

(52) U.S. Cl.
CPC ............ *H04W 88/04* (2013.01); *H04W 8/005* (2013.01); *H04W 76/27* (2018.02)

(56) References Cited

U.S. PATENT DOCUMENTS

| | | | |
|---|---|---|---|
| 2016/0088468 | A1 | 3/2016 | Sharma et al. |
| 2016/0088668 | A1 | 3/2016 | Kim et al. |
| 2016/0205040 | A1 | 7/2016 | Wirtanen et al. |
| 2016/0353356 | A1* | 12/2016 | Payyappilly ...... H04W 28/0268 |
| 2017/0339566 | A1* | 11/2017 | Yasuda ................ H04L 67/141 |
| 2019/0239284 | A1* | 8/2019 | Xu ........................ H04W 80/02 |
| 2019/0268824 | A1* | 8/2019 | Kubota ............. H04W 28/0289 |

FOREIGN PATENT DOCUMENTS

| | | |
|---|---|---|
| WO | 2016024773 | 2/2016 |
| WO | 2016072532 | 5/2016 |

OTHER PUBLICATIONS

European Patent Office Application Serial No. 17839759.2, Search Report dated Feb. 19, 2020, 16 pages.
ZTE, "On connection establishment over PC5", 3GPP TSG RAN WG2 Meeting #90, R2-152548, XP050973322, May 2015, 4 pages.
ZTE, "eNB involvement in remote UEs authorization and connection establishment", 3GPP TSG RAN WG2 Meeting #91, R2-153768, XP051004414, Aug. 2015, 3 pages.
3rd Generation Partnership Project (3GPP), "Technical Specification Group Services and System Aspects; Study on Architecture Enhancements to ProSe UE-to-Network Relay (Release 15)," 3GPP TR 23.733 V0.3.0, XP051240491, Feb. 2017, 19 pages.
ZTE, "Considerations on the UE-to-Network Relays," 3GPP TSG-RAN WG2 #89bis, R2-151169, Apr. 2015, 7 pages.
State Intellectual Property Office of the People's Republic of China Application Serial No. 201780049178.7, Office Action dated Sep. 2020, 19 pages.
PCT International Application No. PCT/KR2017/008527, Written Opinion of the International Searching Authority dated Dec. 5, 2017, 16 pages.
3rd Generation Partnership Project (3GPP), "Technical Specification Group Services and System Aspects; Proximity-based services (ProSe); Stage 2 (Release 13)," 3GPP TS 23.303 V13.4.0, Jun. 2016, 125 pages.
The State Intellectual Property Office of the People's Republic of China Application Serial No. 201780049178.7, Notice of Allowance dated Mar. 9, 2021, 6 pages.
European Patent Office Application Serial No. 17839759.2, Office Action dated Apr. 19, 2021, 16 pages.
LG Electronics, "Clarification on Access control for REAR," 3GPP TSG-SA WG1 #76bis, S1-170073, Jan. 2017, 16 pages.

* cited by examiner (a) Control-Plane Protocol Stack (b) User-Plane Protocol Stack (a) UE-1 and UE-2 campin on different eNBs (b) UE-1 and UE-2 camping on same eNB

METHOD FOR ACCESS CONTROL USING RELAY UE AND APPARATUS THEREFOR

CROSS-REFERENCE TO RELATED APPLICATIONS

This application is the National Stage filing under 35 U.S.C. 371 of International Application No. PCT/KR2017/008527, filed on Aug. 8, 2017, which claims the benefit of U.S. Provisional Application No. 62/371,839, filed on Aug. 8, 2016, the contents of which are all hereby incorporated by reference herein in their entirety.

TECHNICAL FIELD

The present invention relates to a wireless communication system, and more particularly, to a method for controlling access of a remote UE to a base station by using a relay UE when the remote UE transmits or receives data to and from the base station through the relay UE.

BACKGROUND ART

The wireless communication system is being extensively developed in order to provide diverse types of communication devices, such as voice or data services, and so on. Generally, a wireless communication system corresponds to a multiple access system that can support communication with multiple users by sharing an available system source (bandwidth, transmission power, and so on). Examples of the multiple access system may include a CDMA (code division multiple access) system, a FDMA (frequency division multiple access) system, a TDMA (time division multiple access) system, an OFDMA (orthogonal frequency division multiple access) system, a SC-FDMA (single carrier frequency division multiple access) system, a MC-FDMA (multi carrier frequency division multiple access) system, and so on.

Device-to-Device (D2D) communication refers to a communication method that can directly send and receive voice, data, and so on, to and from user equipments without passing through a base station (evolved NodeB; eNB) by setting up a direct link between User Equipments (UEs). D2D communication may include methods, such as user equipment-to-user equipment (UE-to-UE) communication, Peer-to-Peer communication, and so on. Additionally, the D2D communication method may also be applied to M2M (Machine-to-Machine) communication, MTC (Machine Type Communication), and so on.

D2D communication is being considered as one of many solutions for resolving the load of the base station caused by the data traffic, which is increasing at a vast rate. For example, since data can be sent and received to and from user equipments without passing through the base station, unlike in a conventional (or legacy) wireless communication system, network overload may be reduced when using D2D communication.

DISCLOSURE

Technical Problem

An object of the present invention is to provide a method for controlling access of a remote UE to a base station by using a relay UE.

The technical problems solved by the present invention are not limited to the above technical problems and those skilled in the art may understand other technical problems from the following description.

Technical Solution

An access control method of a first UE for transmitting user data to a network through a second UE in a wireless communication system according to one embodiment of the present invention comprises receiving access control information through the second UE; and determining, on the basis of the access control information, whether to perform an access control check for the user data depending on whether the user data are data to which an access control scheme allowed in an indirect connection mode is applied, wherein the access control information includes information on an access control scheme which is allowed or not allowed in the indirect connection mode.

At this time, if the first UE is connected with the network by a direct connection mode, the access control check may be performed regardless of an access control scheme applied to the user data.

Also, if the user data are data to which an access control scheme which is not allowed in the indirect connection mode is applied, the user data may be transmitted to the second UE without the access control check for the user data.

Also, the method may further comprise performing the access control check for the user data if the user data are data to which an access control scheme allowed in the indirect connection mode is applied, and transmitting the user data to the second UE if it is determined that transmission of the user data is allowed.

Also, if it is determined, by the access control check, that transmission of the user data is not allowed, a timer corresponding to the user data operates, and the access control check may be performed again per certain time interval and the user data may be deleted if transmission of the user data is not allowed until the timer expires.

An access control method of a second UE for transmitting user data of a first UE to a network in a wireless communication system according to one embodiment of the present invention comprises receiving access control information from the network; receiving the user data from the first UE; and determining, on the basis of the access control information, whether to perform an access control check for the user data depending on whether the user data are data to which an access control scheme allowed in an indirect connection mode is applied, wherein the access control information includes information on an access control scheme which is allowed or not allowed in the indirect connection mode.

At this time, if the user data are data to which an access control scheme which is not allowed in the indirect connection mode is applied, the user data may be transmitted to the second UE without the access control check for the user data.

Also, the method may further comprise performing the access control check for the user data if the user data are data to which an access control scheme allowed in the indirect connection mode is applied, and transmitting the user data to the network if it is determined that transmission of the user data is allowed.

Also, if it is determined, by the access control check, that transmission of the user data is not allowed, the first UE may be requested to suspend transmission of the user data.

Also, if updated access control information is received from the network, the access control check for the user data may be performed based on the updated access control information, and if it is determined, by the access control check, to transmit the user data to the network, the first UE may be requested to resume transmission of the user data.

Also, if it is determined, by the access control check, that transmission of the user data is not allowed, a timer corresponding to the user data may operate, and the access control check may be performed again per certain time interval and the user data may be deleted if transmission of the user data is not allowed until the timer expires.

Meanwhile, a first UE for transmitting user data to a network through a second UE in a wireless communication system according to the present invention comprises a radio frequency (RF) unit; and a processor configured to control the RF unit, wherein the processor is configured to receive access control information through the second UE and determine, on the basis of the access control information, whether to perform an access control check for the user data depending on whether the user data are data to which an access control scheme allowed in an indirect connection mode is applied, and the access control information includes information on an access control scheme which is allowed or not allowed in the indirect connection mode.

Meanwhile, a second UE for transmitting user data of a first UE to a network in a wireless communication system according to the present invention comprises a radio frequency (RF) unit; and a processor configured to control the RF unit, wherein the processor is configured to receive access control information from the network by controlling the RF unit, receive the user data from the first UE, and determine, on the basis of the access control information, whether to perform an access control check for the user data depending on whether the user data are data to which an access control scheme allowed in an indirect connection mode is applied, and the access control information includes information on an access control scheme which is allowed or not allowed in the indirect connection mode.

It is to be understood that both the foregoing general description and the following detailed description of the present invention are exemplary and explanatory and are intended to provide further explanation of the invention as claimed.

Advantageous Effects

According to the present invention, a relay UE may provide a Quality of Service (QoS) suitable for a type of data and a current traffic status by controlling data transmission of a remote UE.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR CARRYING OUT THE INVENTION

Figure 1:
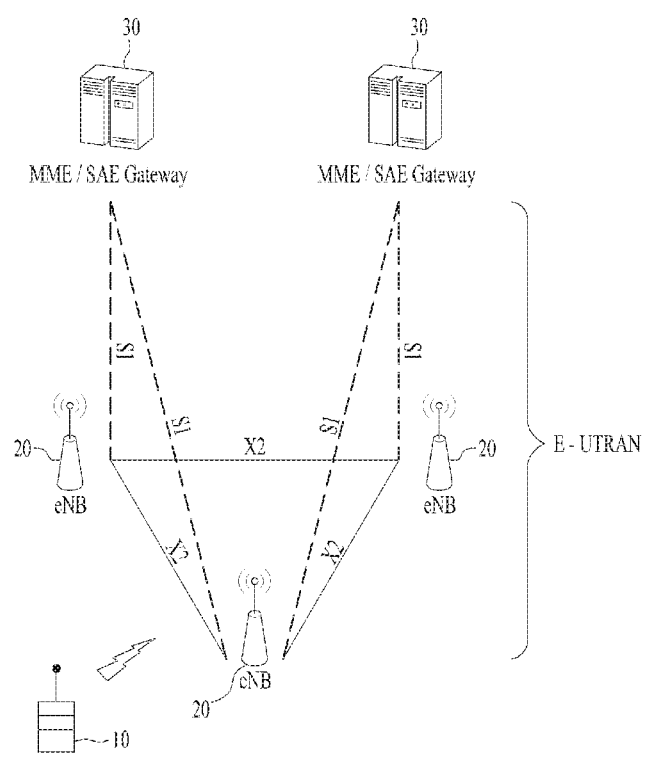
FIG. 1 is a block diagram illustrating network structure of an evolved universal mobile telecommunication system (E-UMTS).

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

The terms used in this specification are defined as follows.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. In the present invention, a UE can be regarded as a UE capable of receiving an MCPTT (Mission Critical Push To Talk) service, i.e., MCPTT capable UE.

Proximity Services (or ProSe Service or Proximity based Service): a service that enables discovery between physically proximate devices, mutual direct communication through a base station, or communication through the third party device. Here, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a direct communication path.

ProSe Communication path: communication path supporting ProSe Communication. The ProSe E-UTRA Communication path could be established between the ProSe-enabled UEs using E-UTRA, or via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, which uses a common communication path, between more than two ProSe-enabled UEs in proximity.

ProSe UE-to-Network Relay: ProSe-enabled Public Safety UE that acts as a communication relay between a ProSe-enabled UE and the ProSe-enabled network using E-UTRA.

Remote UE: This is a Prose-enabled UE connected to EPC network, i.e. perform communication with a PDN, through Prose UE-to-Network Relay without service from E-UTRAN.

ProSe UE-to-UE relay: a form of relay in which a ProSe-enabled UE acts as a ProSe Communication relay between two other ProSe-enabled UEs.

ProSe-enabled Network: a network that supports ProSe Discovery, ProSe Communication and/or ProSe-assisted WLAN direct communication. Hereinafter, the ProSe-enabled network may simply be referred to as a network.

Model A: involves one UE announcing "I am here". This model defines two roles for the ProSe-enabled UEs that are participating in ProSe Direct Discovery.

Announcing UE: The UE announces certain information that could be used by UEs in proximity that have permission to discover.

Monitoring UE: The UE that monitors certain information of interest in proximity of announcing UEs.

Model B: involves one UE asking "who is there" and/or "are you there". This model defines two roles for the ProSe-enabled UEs that are participating in ProSe Direct Discovery.

Discoverer UE: The UE transmits a request containing certain information about what it is interested to discover.

Discoveree UE: The UE that receives the request message can respond with some information related to the discoverers request.

Proximity: proximity is determined when given proximity criteria are fulfilled.

User service description (USD): in the USD (see 3GPP TS 26.346), the application/service layer provides for each service the TMGI (Temporary Mobile Group Identity), the session start and end time, the frequencies and the MBMS service area identities (MBMS SAIs, see definition in section 15.3 of 3GPP TS 23.003) belonging to the MBMS service area (see definition in 3GPP TS 23.246).

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2:
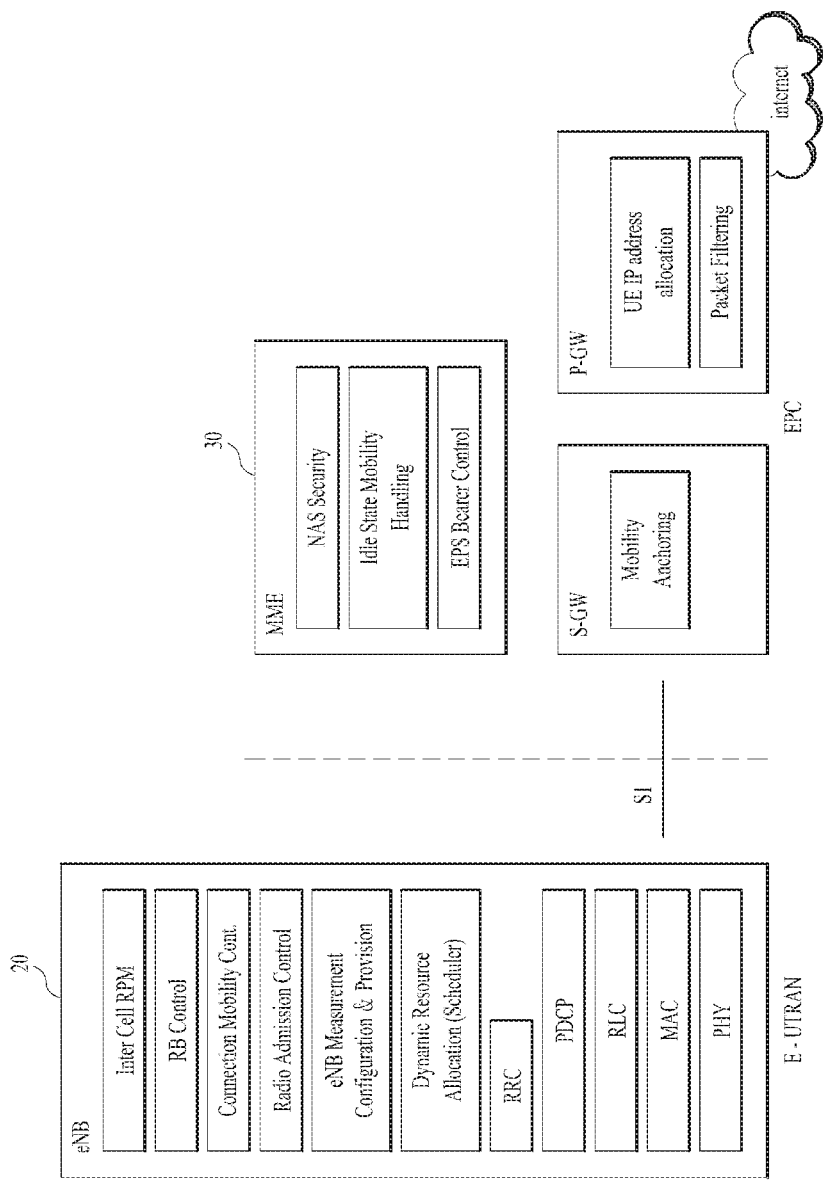
FIG. 2 is a block diagram depicting architecture of a typical E-UTRAN and a typical EPC.

FIG. 2 is a block diagram depicting architecture of a typical E-UTRAN and a typical EPC.

As illustrated in FIG. 2, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
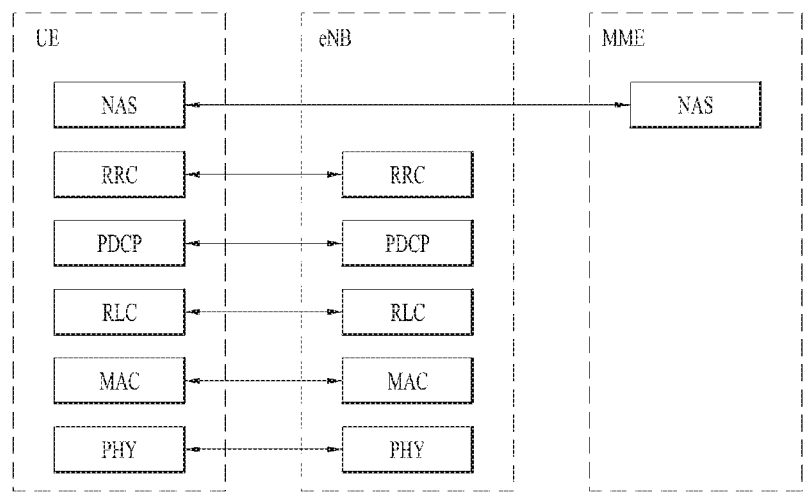
FIG. 3 is a diagram showing a control plane and a user plane of a radio interface protocol between a UE and an E-UTRAN based on a 3rd generation partnership project (3GPP) radio access network standard.
Figure 3:
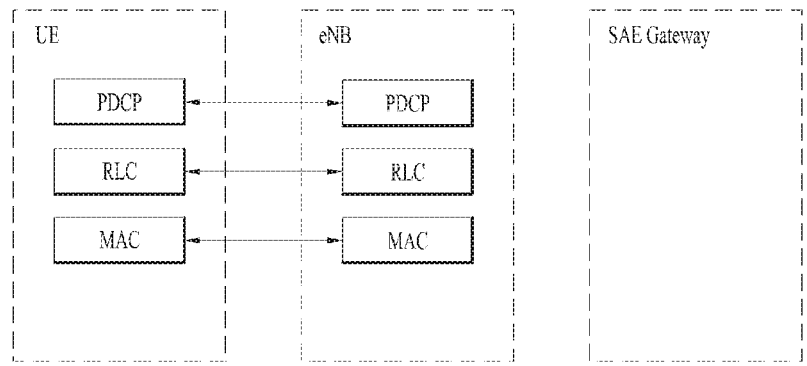

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
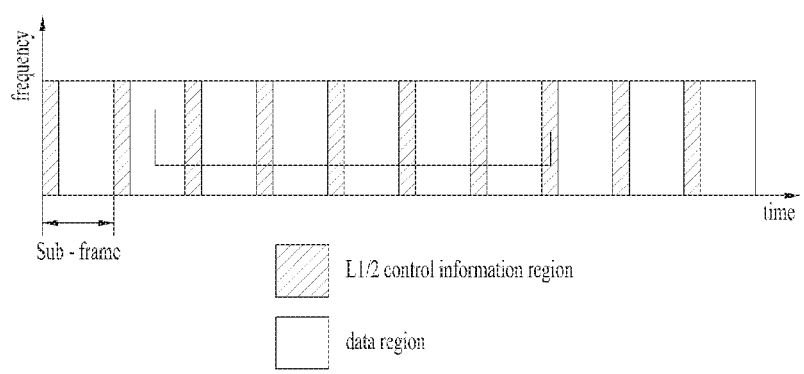
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
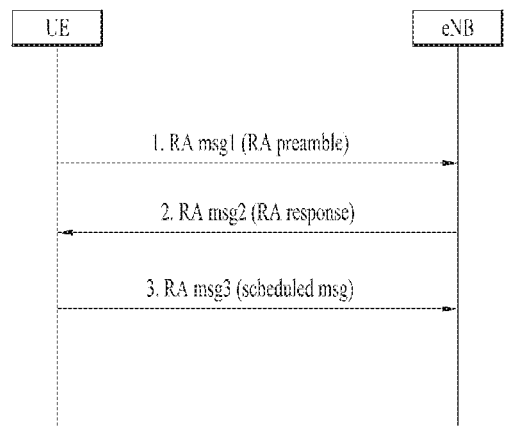
FIG. 5 is a flow diagram illustrating a random access procedure.

FIG. 5 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).

The UE may perform UL transmission according to resource allocation information (i.e., scheduling information) and a TA value in the RAR. HARQ is applied to UL transmission corresponds to the RAR. Accordingly, after performing UL transmission, the UE may receive reception response information (e.g., a PHICH) corresponding to UL transmission.

Figure 6:
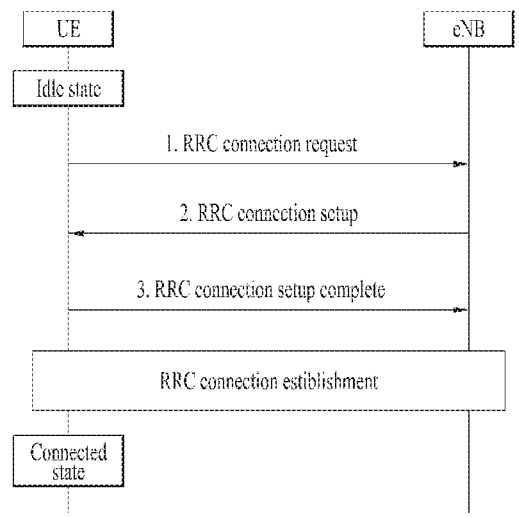
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle state.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 6.

1. When the UE in the idle state desires to establish RRC connection for reasons such as an attempt to make a call, a data transmission attempt, or a response of the eNB to paging, the UE transmits an RRC connection request message to the eNB first.

2. Upon receiving the RRC connection request message from the UE, the eNB accepts the RRC connection request of the UE when the radio resources are sufficient, and then transmits an RRC connection setup message, which is a response message, to the UE.

3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

A ProSe service is referred to as D2D (Device-to-Device) communication and corresponds to a direct communication technology between UEs.

Figure 7:
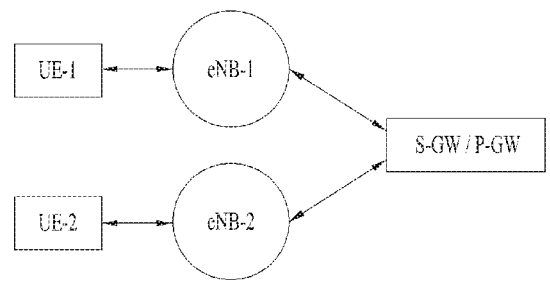
FIG. 7 illustrates a default path (that is, default data path) through which two UEs perform communication in an EPS.

FIG. 7 illustrates a default path (that is, default data path) through which two UEs perform communication in an EPS.

This default path passes through an eNB and a core network (e.g., EPC), which are managed by an operator. In the present invention, this path will be referred to as an infrastructure data path or EPC path. Also, communication through this infrastructure data path will be referred to as infrastructure communication.

Figure 8:
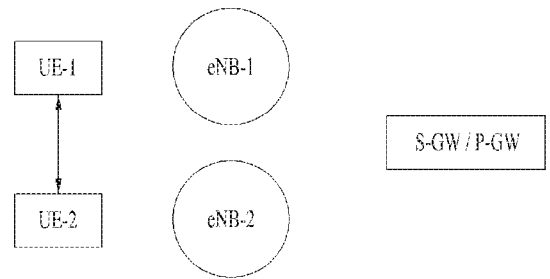
FIG. 8 illustrates a direct mode data path between two UEs based on ProSe.
Figure 8:
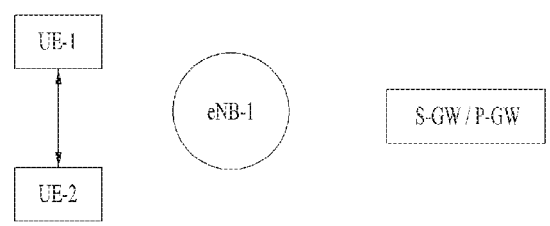

FIG. 8 illustrates a direct mode data path between two UEs based on ProSe. This direction mode data path does not pass through an eNB and a core network (e.g., EPC), which are managed by an operator. FIG. 9(a) illustrates that UE-1 and UE-2 transmit and receive data to and from each other through the direct mode data path while camping on their respective eNBs different from each other, and FIG. 9(b) illustrates that two UEs which are camping on the same eNB transmit and receive data to and from each other through the direct mode data path.

Figure 9:
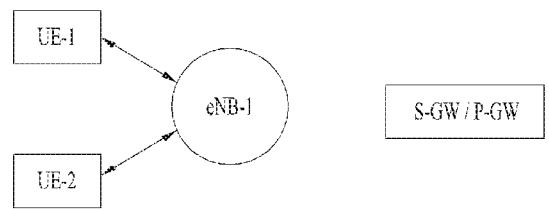
FIG. 9 illustrates a data path through eNB between two UEs based on ProSe, especially a locally-routed data path.

FIG. 9 illustrates a data path through eNB between two UEs based on ProSe, especially a locally-routed data path. This data path through eNB does not pass through a core network (e.g., EPC) managed by an operator.

In the present invention, the data path described in FIGS. 8 and 9 will be referred to as a direct data path, a data path for proximity service, or a proximity service based data path or proximity service communication path. Also, the direct data communication will be referred to as direct communication or proximity service communication or proximity service based communication.

Figure 10:
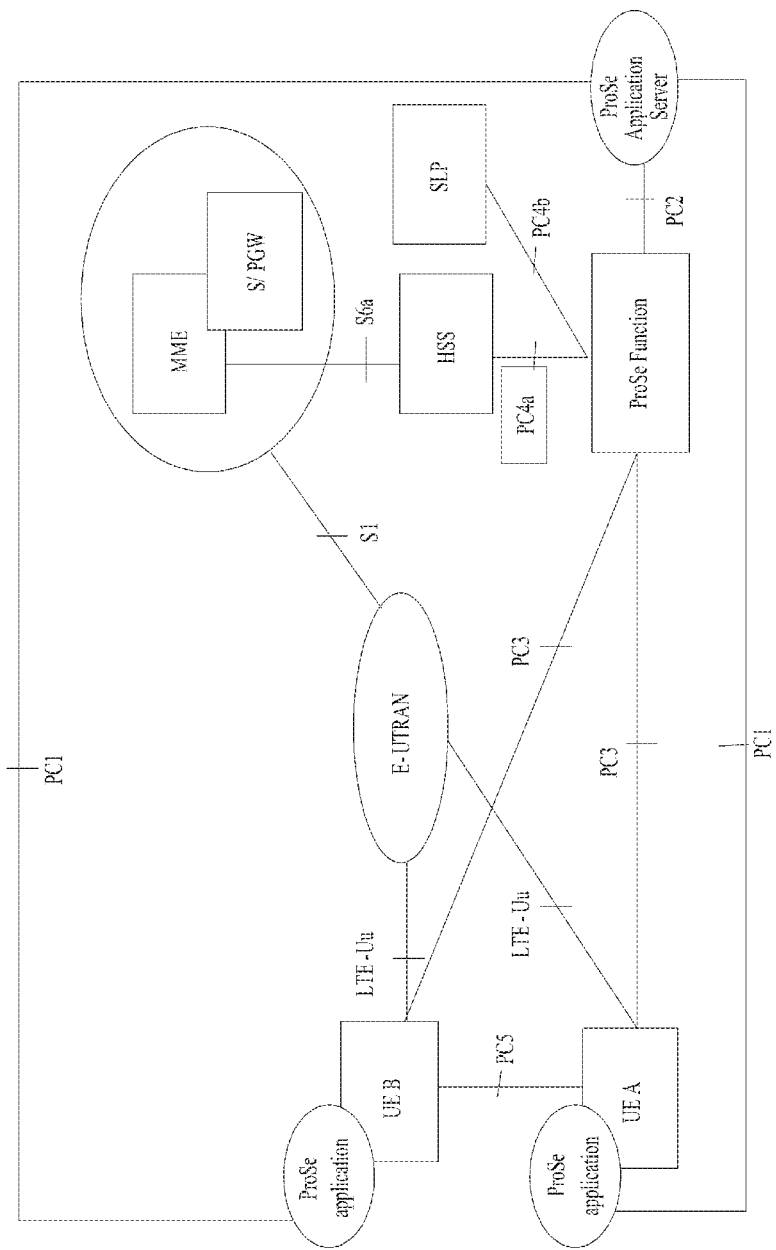
FIG. 10 illustrates a non-roaming reference architecture.

FIG. 10 illustrates a non-roaming reference architecture. In the architecture of FIG. 10, the EPC may perform an EPC-level ProSe discovery procedure of determining proximity of two UEs and notifying the UE of the determined result. This function of determining proximity of the two UEs for EPC-level ProSe discovery and notifying the UE of the determined result is a ProSe function.

The ProSe function may include retrieving and storing ProSe associated subscriber data and/or ProSe associated subscriber data from HSS, and performing EPC-level ProSe discovery and EPC assisted WLAN direct discovery and authentication and configuration for communication. Also, the ProSe function may be operated as a position service client that enables EPC-level discovery, and may provide the UE with information for assisting WLAN direct discovery and communication. The ProSe function includes handling EPC ProSe user IDs and application layer user ID, and exchanging a signal with a third party application server for application identifier mapping. For transmission of a proximity request, proximity alerts and position report, the ProSe function exchanges a signal with a signal of a ProSe function of other PLMNs. In addition, the ProSe function provides various parameters required for ProSe discovery and ProSe communication by the UE. Details of the ProSe function will be understood with reference to 3GPP TS 23.303.

Figure 11:
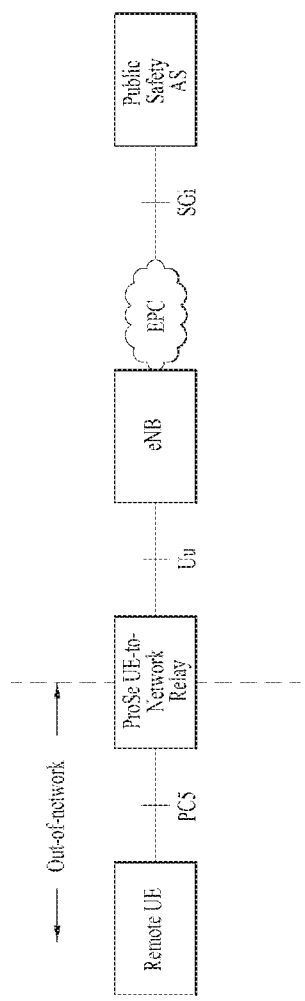
FIG. 11 illustrates communication through a ProSe UE-to-Network relay.

FIG. 11 illustrates communication through a ProSe UE-to-Network relay. A remote UE may perform communication with an application server (AS) or take part in group communication by receiving connectivity to an EPC through a UE-to-Network relay. As a result, a UE (e.g., remote UE of FIG. 11) which is out of network coverage (which is not served by E-UTRAN) may receive a connection service to a network through a ProSe UE-Network relay. In addition, if a UE which is inside network coverage uses a ProSe UE-to-Network relay, since the UE may perform communication by using only a power to reach a relay close thereto rather than an eNB which is distant, battery saving may be achieved.

Figure 12:
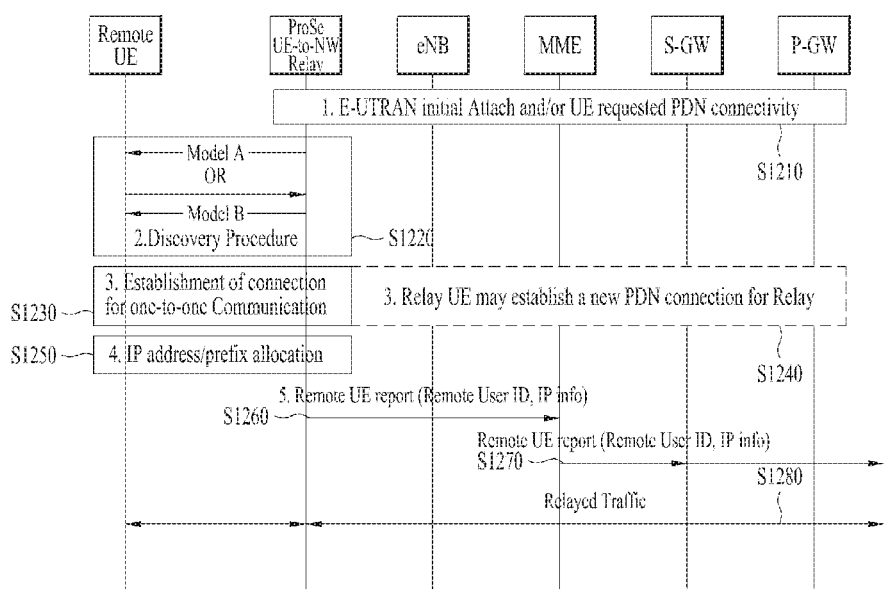
FIG. 12 illustrates a procedure of performing, by a remote UE which is not served by E-UTRAN, direct communication through a UE-to-Network relay.

FIG. 12 illustrates a procedure of performing direct communication through a UE-to-Network relay in a remote UE which is not served by E-UTRAN. A UE which may be operated through a ProSe-UE-to-Network relay may create a PDN connection to provide a relay traffic to the remote UE by accessing the network. The PDN connection which supports a UE-to-Network relay is only used to support a relay traffic to the remote UE.

First of all, the relay UE generates a PDN connection through initial access to the E-UTRAN (S1210), and acquires IPv6 prefix through a prefix delegation function in case of IPv6. Subsequently, the relay UE performs a discovery procedure with the UE according to the model A or B together with the remote UE (S1220). The remote UE selects a relay UE discovered by the discovery procedure and establishes one-to-one direct connection (S1230). If there is no PDN connection according to relay UE ID or additional PDN connection for relay operation is required, the relay UE initiates a new PDN connection procedure (S1240).

Subsequently, IPv6 prefix or IPv4 address is allocated to the remote UE (S1250), whereby an uplink/downlink relay operation is started. If IPv6 prefix is allocated, an IPv6 stateless address auto-configuration procedure is performed, which includes router solicitation signaling from the remote UE to the relay UE and router advertisement signaling from the relay UE to the remote UE. If the IPv6 address is allocated, an IPv4 address allocation using DHCPv4 is performed, which includes DHCPv4 discovery signaling (from the remote UE to the relay UE), DHCPv4 offer signaling (from the relay UE to the remote UE), DHCPv4 request signaling (from the remote UE to the relay UE), and DHCPv4 ACK signaling (from the relay UE to the remote UE).

Subsequently, the relay UE performs a remote UE reporting procedure of notifying an MME that the remote UE has been connected thereto (S1260). The MME notifies that a new remote UE has been connected by performing the remote UE reporting procedure for SGW and PGW (S1270). Then, the remote UE performs communication with the network through the relay UE (S1280). Details of the procedure of generating direct connection will be understood with reference to 3GPP TS 23.303.

Massive mobile data traffics have been generated in a mobile communication network for recent several years due to the development and fast market penetration of smartphones, and a communication traffic type has been remarkably changed from the legacy peer-to-peer communication to communication in which applications perform signal exchange autonomously. In a mobile communication system of high speed and high capacity, traffic congestion control is important in maintaining service stability in various statuses. Also, when a major disaster such as a big earthquake is generated, a mobile data traffic may be increased to an unexpected level and the network may be operated in error. Therefore, the mobile communication system needs a mechanism for preventing an unexpected high traffic from occurring before the unexpected high traffic is generated. To make sure of successful communication for emergency call and/or disaster board, a traffic congestion control mechanism is required to reduce a call which is not important/has a low priority to allow network resources for a call which is important/has a high priority to be available for many users if possible. In 3GPP, a series of traffic congestion mechanisms have been standardized to control mobile communication access for a network. One access control mechanism standardized as a part of 3G (UMTS) specifications and widely used in LTE is referred to as "Access Class (AC)" which is a control technology which uses priority identifier data stored in the UE.

Hereinafter, Application specific Congestion control for Data Communication (ACDC) for data communication which is one of access control mechanisms will be described.

ACDC is an access control mechanism by an operator, and is operated to allow the UE to allow or prevent a new access attempt by an application recognized by an operator. The network may prevent or reduce overload of an access network and/or a core network through ACDC. ACDC categories are ranked in accordance with a probability order which will be restricted. The operator allocates an application, which requires a minimum limitation only, to an ACDC category of the highest priority. As a result, an influence applied to an access attempt of the corresponding application may be reduced. If the operator determines ACDC to be applied to even a roaming UE, a configuration scheme of the aforementioned ACDC categories may be applied to the roaming UE in the same principle. Meanwhile, many applications which are not allocated to the ACDC categories exist in the UE. The UE handles the applications as those corresponding to the ACDC category of the lowest priority. If the operator needs to identify such uncategorized applications, the operator should not allocate the corresponding applications to the ACDC category of the lowest priority.

Requirements related to ACDC will be described. ACDC is applied to both UTRAN and E-UTRAN, and is also applied to a UE which is not a member of one or more of 11 to 15 access classes. A home network should configure at least four ACDC categories in the UE, wherein each ACDC category is related to an application recognized by the operator. The ACDC categories are ranked in accordance with a probability order which will be restricted. An HPLMN operator is responsible for providing ACDC categories to the UE. A serving network should broadcast control information (for example, barring rate) per ACDC category within one or more regions of a RAN, and should also broadcast whether the roaming UE is a target of ACDC control. The UE may control whether to allow an access attempt of a specific application in accordance with control information broadcast and ACDC category configuration in the UE. The serving network should indicate ACDC simultaneously with another type access control mechanism. For example, if ACDC and an Access Class Barring (ACB) control mechanism are indicated, ACDC is first applied prior to ACB. In the case that a plurality of core networks share the same access network, the access network should be able to apply ACDC for different core networks. To attenuate congestion in a shared RAN, a barring rate should equally be configured for all operators.

The aforementioned ACDC mechanism is applied to the case that the UE attempts establishment of an RRC connection, and is not applied to the case the UE is already in RRC connected mode. That is, if the UE in RRC idle mode has data to be transmitted, the UE identifies whether an application, which has generated data, is barred from establishing an RRC connection. However, after the UE transitions to an RRC connected mode for any reason, the UE does not identify whether data from a specific application are barred. A data path does not exist between the UE in RRC connected mode and the network. If data are received from the application, the UE may easily determine whether to establish an RRC connection. On the other hand, one or more data paths exist between the UE in the RRC connected mode and the network. Therefore, a barring mechanism which uses a control of RRC connection establishment is not operated. For example, it is assumed that downloading of moving images is barred in a cell. For a UE in idle mode, even if the UE desires to download a moving image, such an operation is barred. On the other hand, the UE may establish a connection with the network for voice communication and start downloading of a moving image after transition to RRC connected mode. In this case, a problem may occur in that barring is not performed in accordance with a desired scenario.

Unlike a wireless communication mode such as WiFi, in a cellular network communication service directly installed and managed by a communication operator, each communication operator intends to provide several users with a communication service with quality of a certain level or more. Particularly, the amount of radio resources used in wireless communication varies depending on a communication frequency width allocated to each operator and the number of eNBs which are installed. Also, quality of a communication service provided by each operator is additionally affected by various factors such as the number of subscribers.

Particularly, it is assumed that a data speed provided by one eNB is X mbps and a data speed of Y mbps per one call is required for one user in a voice call service which is the most basic in a communication service. In this case, maximum simultaneous calls that may be supported by one eNB may be calculated by X/Y. Therefore, if calls are simultaneously performed in one cell as much as X/Y, a new call of another user cannot be performed normally.

In another case, Internet browsing or chatting service will be considered. It is assumed that the number of users who simultaneously use the service in one cell is K and a maximum speed that may be provided in one cell is M. In this case, it may be calculated that a communication service may be provided to each user at a speed of an average M/K mbps. However, there may be a case that should be processed more early in accordance with each user. For example, if a random UE A is a UE of a general user, and a UE B is a UE of a specific user, for example, a police officer, call/Internet data generated the UE B are more important than those of the UE A. Therefore, if the UE A and the UE B simultaneously start to call, a prior call should be configured for the UE B. If data are generated simultaneously, it is preferable that a higher data speed is provided to the UE B. To support this operation, a cellular communication system indicates a UE that can access a network or a parameter that should be used during access attempt before the UE accesses the network.

However, if a UE (hereinafter, remote UE) currently accesses the network through another UE (hereinafter, relay UE), and if the network cannot control traffic of the remote UE, the network cannot perform the above operation (access control/management per UE). For example, it is assumed that a smartphone provides a tethering service. In this case, the smartphone may perform an IP connection by accessing a cellular system through a communication system such as LTE. If the smartphone provides a tethering service to a smart watch by using a hot spot function, the smart watch is connected to the smartphone by using the communication technology such as WiFi. In this case, the eNB or the network such as EPC cannot control access caused by the smart watch. Therefore, even though an important urgency call is generated in the smart watch, or the smart watch generates data of a low priority, for example, a message such as "keep alive", the network cannot identify the two scenarios from each other. Also, a problem occurs in that Quality of Service (QoS) suitable for each status is not provided considering priority of various data generated between the above smartphone and another smartphone.

Therefore, the present invention is intended to suggest a method for providing a radio communication service suitable for each UE by effectively controlling a network access of a remote UE and a relay UE when the remote UE receives a network service such as PDN connection through the relay UE.

Prior to description of the method for access control, a method for transmitting data from a remote UE to a base station by using a Prose or D2D service in accordance with the embodiment of the present invention will be described with reference to FIG. 13.

Figure 13:
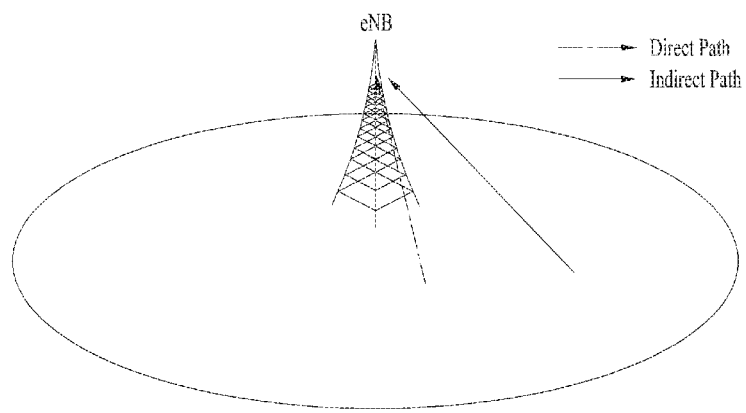
FIG. 13 is a diagram illustrating a data transmission path of a remote UE according to the embodiment of the present invention.

Referring to FIG. 13, the remote UE may transfer data to a base station (eNB) through two paths. One of the two paths is a direct path where the remote UE directly transmits data to the eNB, and the other one is an indirect path where the remote UE transfers data to the eNB through the relay UE.

That is, if the remote UE uses the direct path, the remote UE transmits data to the eNB through a Uu interface. Also, if the remote UE uses the indirect path, the remote UE transmits data, which are desired to be transmitted to the eNB, to the relay UE through a ProSe service, that is, a PC5 interface, and the relay UE which has received the data transmits the data to the eNB through the Uu interface. That is, the indirect path is that the remote UE transmits data to the eNB through a UE-to-network relay.

Now, a method for access control for transmission of data generated from the remote UE will be described in accordance with the embodiment of the present invention.

Embodiment 1

*Access Control by Remote UE

If data which should be transmitted to an uplink are generated, the remote UE first checks whether to transmit the data to the relay UE or whether to request the relay UE of the data relay before transferring the data to the relay UE, and may request the relay UE of data transmission only if allowed.

If data to be transmitted to an uplink are generated, the remote UE determines whether to request the relay UE of the data transfer or whether to transmit the data to the relay UE in accordance with access control information provided by a system information block (SIB) which is broadcast in a cell on which the remote UE camps.

The access control information provided by SIB may include the followings:

information as to whether data transmission of a random application has been allowed or barred;

information as to whether data transmission of a random application category has been allowed or barred;

information as to whether data transmission of a random service has been barred;

information as to whether data transmission of a random IMS service, for example, MMTEL, MMVoice service has been allowed or barred;

information on whether data transmission of a UE which belongs to a random access class (AC) has been allowed or barred;

service specific access control (SSAC) information;
   paging priority access control (PPAC) information;
   access class barring (ACB) information;
   application specific congestion control (ACDC) information;

access control information having a purpose similar to the above case;

other information (e.g., barring time, barring factor, etc.) transferred together with the control information; and/or access information on a low priority UE.

The remote UE which has received access control information through the SIB determines whether transmission of the generated data has been allowed or barred in accordance with the access control information. If transmission of the generated data has been allowed, the remote UE requests the relay UE of transfer of the data or transmits the data to the relay UE.

For example, if ACB information is transmitted through the SIB, the remote UE may determine whether its access has been allowed in accordance with a process according to ACB by using its AC. For another example, if ACDC is transmitted through th eSIB, the remote UE may determine a random application or application category to which the generated data correspond, and may determine whether its access has been allowed by using ACDC control information according to the determined result.

If access is not allowed in the above procedure, the remote UE may again perform the check after a certain time in accordance with each procedure (for example, in accordance with a scheme designed in ACB or ACDC).

In performing access control based on the remote UE as described above, to prevent the relay UE from checking the access control once more despite that the remote UE has checked the access control, if the remote UE requests the relay UE to request data transfer or transmit the data, the remote UE may additionally transfer the following information together with the data:

for example, information as to whether the remote UE has checked an access grant in accordance with the access control information transmitted through the SIB; and/or information on the result.

If the remote UE directly checks an access grant and transfers data to the relay UE only if the access is allowed, the relay UE receives a transfer request of data from the remote UE or if data required to be transferred to the network are received, the relay UE directly transfers the data to the network without checking whether to grant an access. That is, if the remote UE performs the access control check, the relay UE may not perform the access control check separately. For example, if the remote UE performs the access control check and an access attempt of the remote UE is granted, the relay UE may transmit a connection request to the network without performing the access control check separately.

In the present invention, the relay UE may directly transfer data from the remote UE to the network without performing the access control check only if the remote UE has checked whether to grant the access and the access grant has been notified. That is, the relay UE may skip a check whether to grant the access for the data of the remote UE only if the remote UE has checked whether to grant the access and the access grant has been notified.

*Access Control by Remote UE

If the remote UE has not checked the access grant directly or there is no information on the access, the relay UE directly performs a check for the access grant, that is, the access control check for data transferred from the remote UE. The relay UE controls transmission of data of the remote UE to the network in accordance with the result of the access control check.

To this end, the remote UE may provide the relay UE with an application for the data, an application category, information as to whether an IP Multimedia Subsystem (IMS) network is used, information as to whether the data are Multimedia Telephony (MMTEL)/MMVoice related data, or information on AC of the remote UE when transmitting data to the relay UE.

The relay UE which has received the above information from the remote UE checks whether to grant an access to a cell in accordance with the received information, and performs RRC connection procedure if the access is granted as a result of the check. That is, the relay UE determines an access to the network by using the access class information, which is transferred from the remote UE, not its access class.

However, when the relay UE is requested from the remote UE to transfer the data to the network, since the relay UE has already performed the RRC connection with the eNB, the relay UE may skip the check if the relay UE establishes RRC connection with RRC layer of the eNB and is shifted to RRC connected state. That is, the relay UE may immediately transfer the data received from the remote UE to the network without performing the check.

Meanwhile, as another embodiment, if the remote UE transmits the data generated by the remote UE to the network through the relay UE, the network may transfer information as to whether the remote UE or the relay UE will perform the check for the access grant. Therefore, a role of each of the remote UE and the relay UE may naturally be defined during the above operation.

At this time, PC5 interface may be used between the remote UE and the relay UE. That is, data transmission/reception may be performed in a manner designated in ProSe or D2D communication. Also, data transmission/reception may be performed between the remote UE and the relay UE in a wireless communication mode designated in 802.11, that is, a wireless communication mode designated in WiFi or WLAN.

Meanwhile, in the aforementioned procedure, if the remote UE cannot perform access to a cell or reception of SIB information transmitted from the cell and communication with the relay UE at the same time, the remote UE may transmit this information to the relay UE.

In this case, the relay UE may transfer the access control information received from the cell to the remote UE. The remote UE which has received the access control information may operate as described above in accordance with the received access control information.

Meanwhile, if the relay UE is in a communication range of the remote UE regardless of the fact that the remote UE is out of coverage or in coverage, the remote UE should receive a service by accessing a 3GPP network through the relay UE. Therefore, in the aforementioned method, although the remote UE has determined whether to access the network by directly receiving the SIB from the eNB, the remote UE should control the access to the network even without directly receiving the SIB from the eNB.

To this end, the present invention suggests that the relay UE should transfer access control related information such as ACB, ACDC, SSAC, and EAB (Extended Access Barring) to the remote UE to control the access of the remote UE to the network. Particularly, since access control information transmitted from each cell by the eNB may be changed dynamically in accordance with cell load, whenever the access control related information is updated in the cell, the relay UE may receive the updated access control related information and transfer the updated access control related information to the remote UE.

Figure 14:
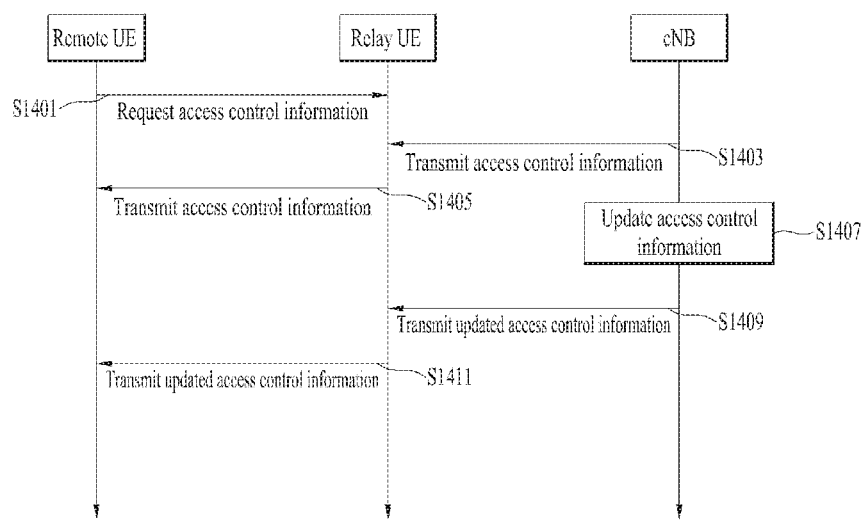
FIG. 14 is a diagram illustrating a method for receiving access control information in a remote UE from a relay UE in accordance with the embodiment of the present invention.

This method will be described in detail with reference to FIG. 14. The remote UE requests the relay UE to transmit the access control related information (S1401). Then, the relay UE receives the access control information through the eNB (S1403), and transfers the received access control information to the remote UE (S1405). Afterwards, if the eNB updates the access control information (S1407) and transmits the updated access control information to the relay UE (S1409), the relay UE transfers the updated access control information to the remote UE (S1411).

Meanwhile, in addition to the aforementioned method, as another method for controlling access of the remote UE to the network, if the remote UE has data to be transmitted to the network and also has connection context with the relay UE, the remote UE may request the relay UE to transmit the latest access control related information. The relay UE which has received the request may transfer the access control information of the latest version, which is received from the eNB through the SIB, to the remote UE. In other words, if the access control related information is requested from the remote UE, the relay UE may newly receive access control information from the eNB through the SIB and transfer the access control information to the remote UE.

However, if the remote UE and the relay UE have mutual connection, the remote UE may regard that a data transport path or an EPS bearer is activated. Therefore, the remote UE may determine that it does not need to perform RRC connection procedure and thus does not need to perform access control. In this case, the eNB cannot perform access control for the remote UE. Therefore, if the remote UE transmits data of the same priority through the relay UE, transmission of the data is allowed, whereas the remote UE which should directly be connected with the eNB without passing through the relay UE is barred to access the network as the access control is applied to the same priority data, whereby data transmission may be blocked. This causes a problem that data transmission is different in accordance with a data transmission path of the UE.

Therefore, if the remote UE is connected to the relay UE and thus may transmit data to the relay UE at any time, access control is performed when the relay UE transfers the data received from the remote UE to the eNB. As a result, even though a random UE transmits data having a similar priority through a random path, a similar data processing procedure may be applied to the data.

In detail, when the remote UE transmits data to the relay UE, access control assistance (ACA) information of the data may be transmitted together with the data. The ACA information may include the following information.

Priority information of data transmitted from the remote UE, or PPPP (Prose Per-Packet Priority) related information Access class information of the remote UE Information as to whether the remote UE has a low priority Information as to whether data transmitted from the remote UE is related to VoLTE or IMS call Information as to whether data transmitted from the remote UE is signaling information or mobile originated (MO) data Information on an application related to data transmitted from the remote UE, such as application ID of ACDC or ACDC category.

If the relay UE should additionally transmit the data to the eNB or the network due to the corresponding data transferred from the remote UE, the relay UE determines whether to transmit the data after comparing the data with the access control information transmitted from the eNB based on the ACA information.

Alternatively, in the procedure of transmitting the RRC connection request to the eNB, the relay UE may check whether to bar an access. For example, the relay UE receives information indicating that an access of data of PPPP=1 has been barred, from the eNB. And then, if the remote UE transfers specific data to the relay UE together with information indicating that PPPP=1, the relay UE determines that access for the specific data has been barred, and does not perform RRC connection establishment procedure. Alternatively, the relay UE waits until barring of the access for the data of PPPP=1 is released, or operates a specific timer and waits until the timer expires.

If the remote UE transfers specific data to the relay UE together with information indicating that PPPP=3, the relay UE determines that the access for the specific data to the eNB has not been barred, and performs RRC connection establishment procedure. Afterwards, if connection with the network is completed, the relay UE transfers the specific data to the eNB.

Meanwhile, the aforementioned operation of the remote UE may be performed using another type access control information, for example, information such as access class.

On the other hand, to control the access of the relay UE to the eNB due to information transmitted from the remote UE, the eNB may transmit separate access control information applied to only the remote UE through the SIB.

That is, to solve a problem generated due to access control information applied without identification of the remote UE and the relay UE, the eNB transmits information for access control corresponding to only the remote UE. For example, although the remote UE is used for a wearable UE, has a low power, and mainly transmits application data transmitted intermittently, the number of remote UEs used as these wearable UEs may be absolutely more than the number of relay UEs such as general smartphones. In this case, if the eNB does not identify the remote UE from the relay UE, and if the remote UEs are increased, access of the relay UE may be restricted unnecessarily. However, considering that a voice call is mainly handled by the smartphone used as the relay UE, more accesses should be ensured for the smartphone used as the relay UE even though there are a lot of UEs in a cell.

Therefore, the eNB may transfer an access control parameter additionally applied to only the remote UE to the relay UE through the SIB, and the relay UE may additionally transfer the access control parameter to the remote UE. Alternatively, when the remote UE directly receives the SIB from the eNB or the relay UE transfers the data transferred from the remote UE to the eNB, the information may be used for additional access control.

The aforementioned access control method will be described in detail with reference to FIG. 15.

First of all, the remote UE and the relay UE mutually establish relay connection (S1501). Afterwards, if data are generated from the remote UE (S1503), the remote UE transfers the generated data to the relay UE, and also transfers access control related information of the generated data together with the data. In this example, a priority of the generated data may be low (S1505).

The relay UE checks whether access control has been performed for the data transferred from the remote UE. For example, the eNB transmits access control information for the remote UE, and the relay UE receives the access control information (S1507). If transmission of data having a low priority in the access control information for the remote UE is disallowed, the relay UE does not transmit the data transferred from the remote UE to the eNB (S1509). In this case, the relay UE transfers access control related information to the remote UE to prevent the remote UE from additionally transmitting data, of which transmission is disallowed, to the relay UE. For example, the relay UE commands the remote UE to suspend transmission of data corresponding to a low priority (S1511).

Afterwards, the eNB transmits new access control information for the remote UE (S1513). At this time, if the relay UE identifies that transmission of data having a low priority of the remote UE has been allowed through the new access control information, the relay UE transmits data received in the step S1505 to the eNB (S1517). Also, if the relay UE has transmitted access control related information to the remote UE in the step S1511, the relay UE transfers the new access control related information received in the step S1513 to the remote UE. That is, if the relay UE has transferred the suspended command to the remote UE in the step S1511, the relay UE transmits a resume command for data transmission to the remote UE (S1519).

Figure 15:
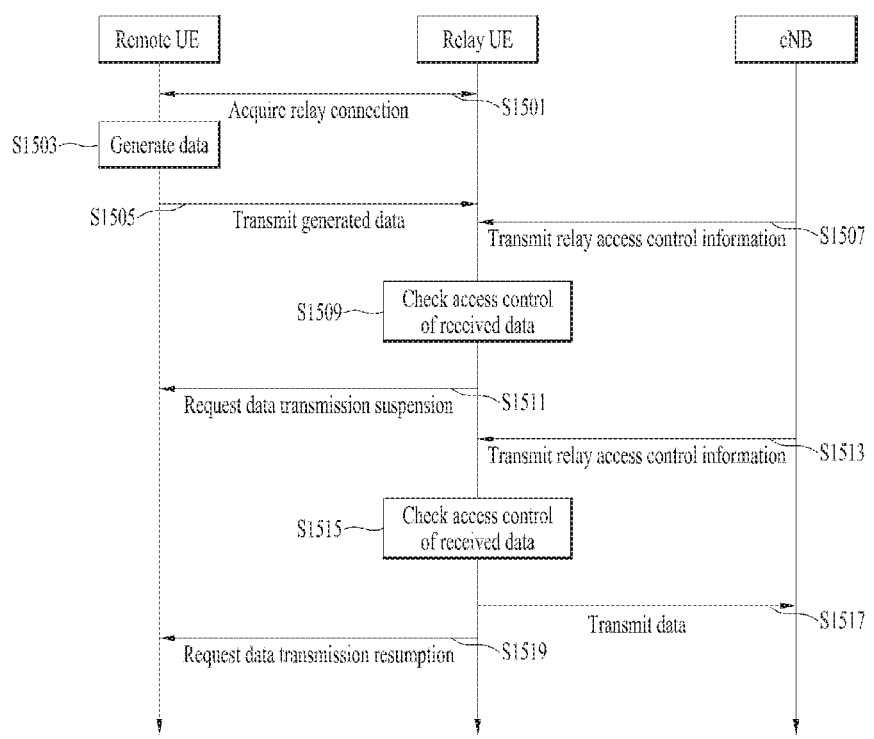
FIG. 15 is a diagram illustrating a method for controlling data transmission of a remote UE by using a relay UE according to the embodiment of the present invention.

In the above description related to FIG. 15, it is assumed that the remote UE does not read SIB of the cell. However, the SIB for access control may be configured such that the remote UE always and directly reads the SIB from the cell. In this case, the procedure of transferring the access control information included in the SIB from the eNB to the remote UE through the relay UE may be skipped.

However, in the above description related to FIG. 15, the relay UE cannot know when the eNB transmits new access control information. Therefore, if the procedure for performing the steps S1507 to S1513 is very long, a problem may occur in that data transferred from the remote UE to the relay UE are stored in the relay UE for an unnecessarily long time. Also, if the data stored in the relay UE for an unnecessarily long time are transmitted to the eNB through the step S1517, since data to be deleted from the application are transmitted to the eNB, a problem occurs in that radio resources are wasted unnecessarily.

To solve this problem, the eNB transmits, to the relay UE, storage time information for controlling how long the data transferred from the remote UE should be stored, in accordance with each data characteristic. Therefore, the relay UE operates a timer corresponding to the storage time information if the data are received from the remote UE, and deletes the received data if the received data cannot be transmitted to the eNB until the timer expires. At this time, a value corresponding to the timer corresponding to the storage time information may be determined in accordance with a logical channel, a priority, etc. The value may be transferred from the eNB or the remote UE to the relay UE.

Meanwhile, in the description related to FIG. 15, although an access and a flow are controlled in accordance with a priority, the access and the flow may be controlled using other information such as logical channel and IP address instead of the priority. For example, the network may command the relay UE to transmit all data corresponding to the remote UE through a specific logical channel. In this case, the network may transmit a command for temporarily suspending or resuming transmission/reception of data through the logical channel to perform access control.

Meanwhile, the remote UE is mainly used for a wearable device, and the relay UE is used as a device such as a smartphone. In this case, since the same user is applied to the remote UE and the relay UE, the remote UE and the relay UE may always be located at a short distance. Therefore, the remote UE and the relay UE perform pairing when they are located at a short distance in a preset condition. At this time, the preset condition may be the case that the same user is applied to the remote UE and the relay UE or the remote UE is allowed to be connected with the relay UE.

That is, this may mean that the remote UE and the relay UE are paired in a state that the relay UE is connected to the eNB. In this case, whenever data are generated from the remote UE, the data are immediately transferred from the remote UE to the eNB through the relay UE through connection established between the relay UE and the eNB, whereby End-to-End latency (E2E latency) is reduced.

However, in the method for establishing a mutual connection between the remote UE and the relay UE, since the eNB should continuously receive a measurement report from the relay UE to maintain a cell corresponding to the best connection to the relay UE, a load of the eNB is great. Also, since the relay UE should continue to measure a peripheral cell, a side effect may occur in that power consumption of the relay UE is increased.

To solve this, in the present invention, if pairing occurs between the relay UE and the remote UE, that is, if there are one or more remote UEs to be supported by a specific relay UE, the relay UE performs RRC connection establishment procedure to transfer the data to the network in accordance with a request of data transmission from the remote UE. In detail, in order that the relay UE identifies data generated from its application from data generated from an application of the remote UE, if the relay UE starts RRC connection establishment to transmit data of the remote UE, RRC connection establishment cause is designated as 'remote UE access' or additional field, for example, a field (or field having the same meaning) called RRC connection request for remote UE access is configured and included in RRC connection request message and then transmitted to the eNB. In this case, the eNB which has received the RRC connection request message may determine whether to perform or reject RRC connection with respect to the relay UE based on the information included in the RRC connection request message. For example, if the eNB determines to allow RRC connection for UEs directly connected thereto, the eNB may first process a case which does not correspond to connection for the remote UE in the received RRC connection request.

However, if there is RRC connection which has been already connected, the RRC connection establishment procedure may not be required.

Embodiment 2

The present invention intends to control a flow of data between the remote UE and the relay UE considering capacity of the relay UE in the procedure of relaying and transferring data between the remote UE and the relay UE.

For example, mass data are generated from the smartphone, which serves as the relay UE, due to video uploading. If mass data are generated from the remote UE connected with the relay UE, and if the remote UE unilaterally transmits the data, a buffer overflow or memory lack may occur in the relay UE due to the data.

Therefore, to solve this problem, the present invention suggests that the relay UE should transmit, to the remote UE, buffer control information on the amount of data accumulated in its buffer or information on data which the remote UE may request the relay UE to transmit.

In detail, the buffer control information may include the followings:

information on application or application category to which data belong and information as to whether transmission of the corresponding data has been allowed or disallowed;

information on access class (AC) to which the remote UE belongs and information as to whether the remote UE may transmit data or request a transfer of data;

information as to whether data transmission has been allowed or disallowed for each of MMTel/MMVideo or IMS service;

information on a priority to which data belong and information as to whether transmission of the data has been allowed or disallowed; and/or information as to how many data should newly be transmitted in case of data of which transmission is allowed.

If the remote UE receives the buffer control information from the relay UE, the remote UE performs a data transfer request to the relay UE or data transmission to the relay UE in accordance with the indication of the buffer control information. For example, it is assumed that the relay UE transmits, to the remote UE, buffer control information indicating that data corresponding to application categories 1 and 2 have been only allowed. In this case, if the generated data belong to the application category 1, the remote UE transmits the corresponding data to the relay UE. If the generated data belong to application category 3, the remote UE does not transmit the corresponding data to the relay UE.

Embodiment 3

In the embodiment 3 of the present invention, if the remote UE is connected to the network through the relay UE, the network may transmit information on data, which may be transmitted from the remote UE, to the remote UE.

In detail, if a specific remote UE is connected to a core network through the relay UE, the core network may notify the remote UE of data, which may be transmitted through the relay UE, through NAS message or RRC message. In this case, the remote UE may transmit only the data allowed by the information, which is transferred from the network, to the network through the relay UE. That is, the network may transmit information on a traffic, which may be transmitted thereto by the remote UE. At this time, this information transmitted from the network to the remote UE may be transferred through IP address, port number, etc.

Meanwhile, the network may control the relay UE. That is, the remote UE may transmit data generated without any check to the relay UE, and the relay UE may select data to be additionally transferred to the network in accordance with a certain reference. At this time, the certain reference used by the relay UE to select data may be determined based on the information transferred from the network to the relay UE, that is, the information on a traffic of the remote UE, which may be transmitted. This information may be transferred through IP address, port number, etc.

Embodiment 4

A main target of Prose communication supported from Release 12 in 3GPP is communication for public safety, that is, communication for public safety such as police officer/firefighter. Therefore, an access control is not applied to a UE which supports Prose communication for public safety.

This is because that it has been assumed that a dedicated frequency is allocated for communication for public safety like FirstNet of USA.

However, as a wearable device is mainly used in a private zone not a zone for public safety, ProSe communication has been used even in general UEs, and a method for controlling an access for ProSe communication has been suggested. If an access control is equally applied to a public safety UE, network access of the public safety UE may be delayed due to an access of a general UE. In this case, a problem may occur in that transfer of important data is delayed. To prevent this, information as to whether corresponding access control information is applied to a UE for public safety or not may additionally be included in access control information transmitted from the eNB to the remote UE through SIB or access control information received by the relay UE from the eNB and transmitted to the remote UE. Therefore, if the UE for public safety is notified that the access control is not applied to the UE for public safety, the UE for public safety may transfer its data to the relay UE at any time.

Unlike the above description, the remote UE for public safety notifies the relay UE that it is a UE for public safety, and the relay UE which has recognized that the remote UE is a UE for public safety transmits all data received from the remote UE for public safety to the eNB without additional access check. For another example, even though the relay UE receives access control information related to the remote UE from the eNB through SIB, if the remote UE is for public safety, the relay UE does not apply the access control information.

Meanwhile, in order that the eNB may actively perform a control access, the eNB may indicate information as to whether the UE for public safety should perform the access control, through the SIB in the same manner as other general remote UEs. Then, the remote UE and the UE for public safety may operate in accordance with the indicated result.

Embodiment 5

In the aforementioned embodiments 1 to 4, the access control information additionally indicates whether the information is applied when the UE operates in an indirect mode, that is, when the UE operates as a remote UE or an Evolved ProSe Remote UE.

In detail, if ACB related information is transmitted from the cell to the UE directly or indirectly, ACB information may include information as to whether ACB information is applied to a UE of an indirect mode, that is, whether the evolved ProSe remote UE applies a parameter such as Mean Duration and Barring rate in the indirect mode per access type such as Originating and Terminating. Also, the ACB information may include Mean Duration or Barring rate value applied separately in case of the access through the indirect mode. When the evolved ProSe remote UE performs an access to the network in the indirect mode per SMS, MMTEL, and MMVideo, the ACB information may include information as to whether a parameter such as Mean duration and Barring rate is applied.

Similarly, if SSAC parameter is transmitted from the cell to the UE directly or indirectly, the SSAC parameter may include information as to whether the evolved ProSe remote UE applies a parameter such as Mean Duration and Barring rate to an access for MMTEL and MMVideo in the indirect mode. Also, if CSFB (Circuit Switched FallBack) parameter is transmitted from the cell to the UE directly or indirectly, the CSFB parameter may include information as to whether the ProSe remote UE applies a parameter such as Mean Duration and Barring rate to an access for CSFB in the indirect mode.

Also, if EAB related parameter or ACDC related parameter is transmitted from the cell to the UE directly or indirectly, the EAB related parameter or the ACDC related parameter may include information as to whether the evolved ProSe remote UE applies the corresponding parameter such as Mean Duration and Barring rate when performing an access in the indirect mode.

Also, if the aforementioned parameters should be applied in each access control mechanism by the access control information, the evolved ProSe remote UE applies the corresponding parameter in the indirect mode and as a result, starts the access related operation such as a data transmission operation to the relay or RRC connection establishment related operation only if the access is allowed.

Meanwhile, if the relay UE transfers the access control information received through the SIB to the remote UE, the relay UE may transfer related access control information to the remote UE only if it indicates that the corresponding access control information is applied even in the case that the remote UE in the indirect mode performs an access. That is, if the relay UE receives the access control information from the cell through the SIB and the evolved ProSe remote UE is connected to the relay UE, the relay UE may transfer only the received access control information applied to the remote UE to the corresponding remote UE.

However, if a plurality of UEs exist in one cell and each UE is connected with additional remote UE, all relay UEs transfer SIB information such as access control information to the remote UE. In this case, a demand of radio resources is generated, especially the same information should repeatedly be transferred to another remote UE, whereby system resources are used inefficiently. To solve this, it is preferable that the relay UE transfers SIB information such as access control to the remote UE only if the remote UE is actually in the indirect mode. To this end, if the remote UE is connected with the relay UE, the remote UE notifies the relay UE whether the remote UE directly reads SIB, etc. or the relay UE should transfer information such as SIB. Then, the relay UE transfers the access control information received through the SIB to the remote UE only if the remote UE does not read SIB or the relay UE requests the remote UE to transfer information such as SIB.

A detailed exemplary method for the aforementioned embodiment 5 will be described through the embodiment 6 which will be described later.

Embodiment 6

Figure 16:
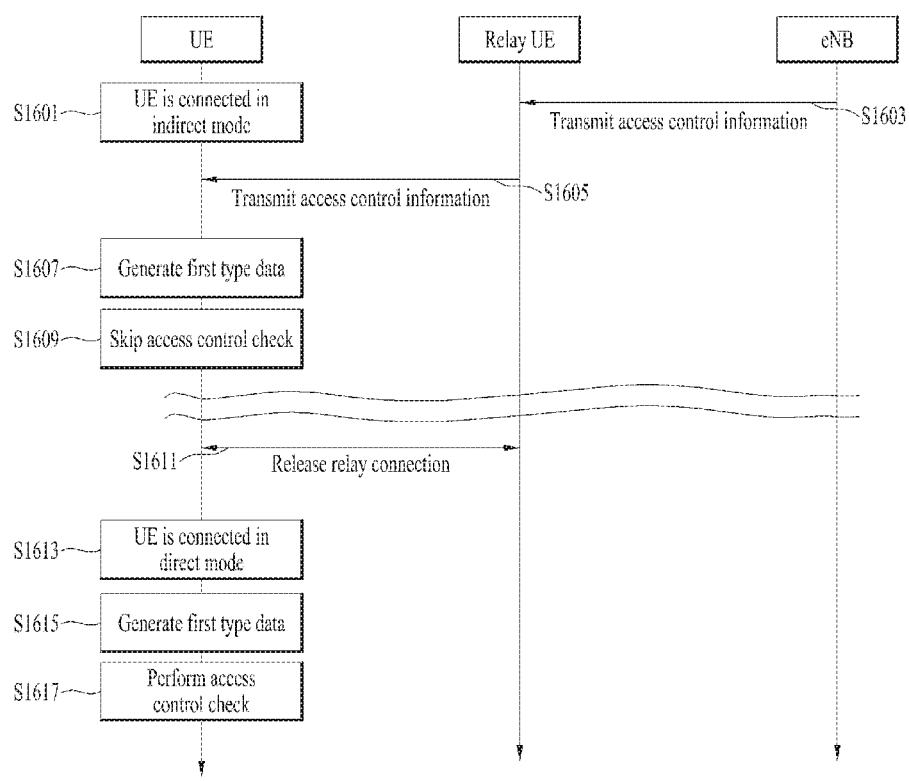
FIGS. 16 and 17 are diagrams illustrating a method for performing an access control check for data generated by a UE according to the embodiment of the present invention.

Now, the detailed example for the embodiment 5 will be described with reference to FIGS. 16 to 18. Referring to FIG. 16, it is assumed that the UE is connected with the relay UE and is in an indirect mode (S1601). That is, the UE is in a remote UE state.

The network transmits access control information to the relay UEs through the SIB (S1603). At this time, the access control information may indicate that the EAB related access control information is applied even in the indirect mode, and the CSFB related access control information is not applied in the indirect mode.

The relay UE which has received the access control information again transmits the access control information to the remote UE (S1605). Afterwards, data are generated by the remote UE, and it is assumed that the generated data are voice call related data (S1607). The remote UE recognizes that the data generated in the step S1607 are voice call related data, and checks whether an access control is required for a voice all. That is, the remote UE checks the access control information received in the step S1605. Since the corresponding access control information indicates that the CSFB related access control information is not applied in the indirect mode, the remote UE skips the access control check and performs additional operations for voice call connection (S1609).

The remote UE may release connection with the relay UE by determining that the relay UE is not required any more (S1611). For example, the remote UE may be located to be very close to the eNB, or may not be assured of proper QoS through the relay UE.

As a result of the step S1611, the UE is shifted to a direct mode (S1613). Afterwards, if data the same type as the data generated in the step S1607, that is, voice call related data are generated by the UE (S1615), the UE checks that CSFB related access control information is included in the received access control information, and performs a check as to whether it can be connected to the network by using the corresponding CSFB related access control information because the UE is not in the indirect mode (S1617). In accordance with the checked result, if it is determined that transmission of the data is allowed, the UE may transmit the data to the eNB. On the contrary, as a result of the checked result, if it is determined that transmission of the data is not allowed, the remote UE does not transmit the data to the eNB.

At this time, as described in the embodiment 1, the remote UE may operate the timer according to the data, and may again perform the check per certain time interval. If transmission of the data is not allowed until the timer expires, the remote UE may delete the data.

In the description related to FIG. 16, the UE determines whether to perform an access control check by checking whether the received access control information is applied only in the direct mode or applied even in the indirect mode depending on whether the UE is in the direct mode or the indirect mode. In case of a voice call, as a setup time of the voice call is increased, a consumer's dissatisfaction becomes high. Therefore, it is preferable to minimize an access control in case of a voice call. If the remote UE performs an access control check for data of a UE which uses an indirect mode and the relay UE also performs an access control check, latency in voice call setup may occur correspondingly. Therefore, in this case, it is preferable that the network selectively indicates an access control parameter applied to the UE of the indirect mode and an access control parameter which is not applied to the UE of the indirect mode.

Figure 17:
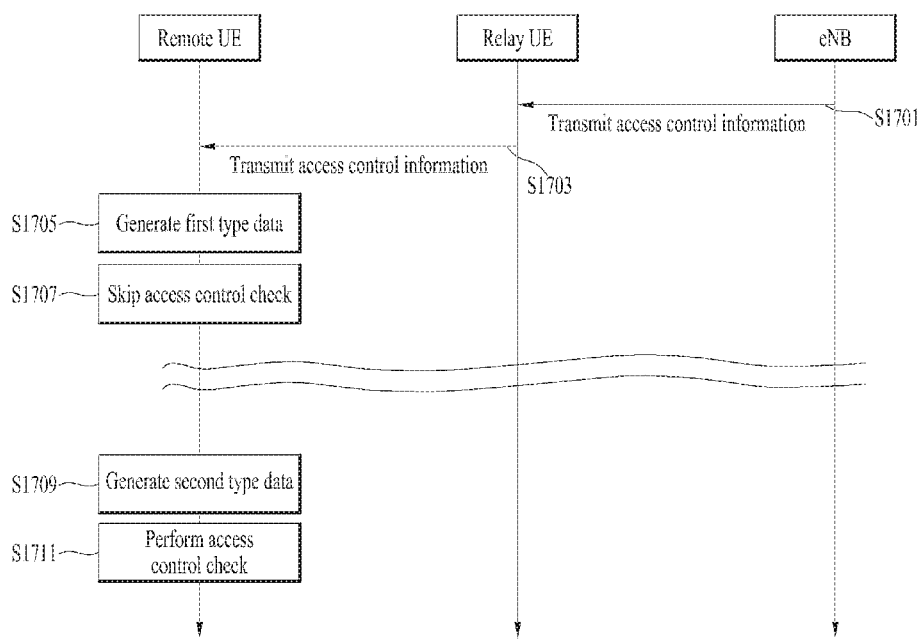
Figure 18:
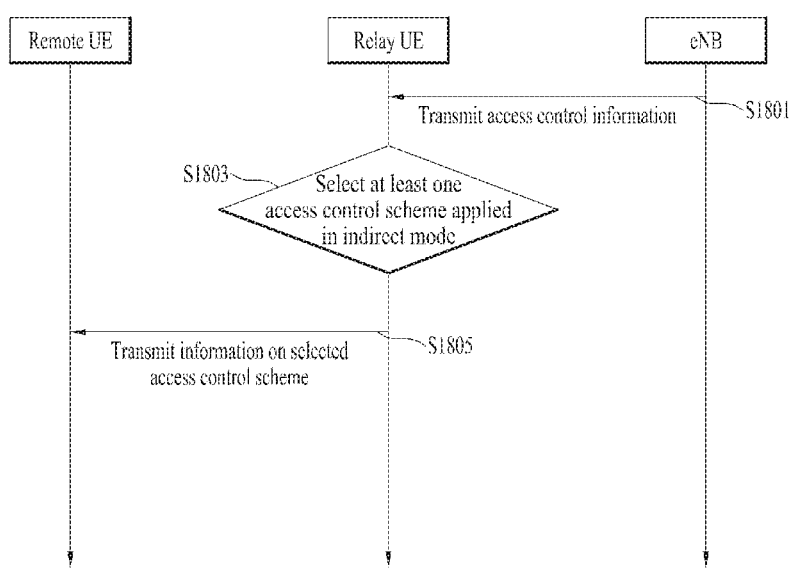
FIG. 18 is a diagram illustrating a method for transferring access control information of a relay UE to a remote UE in accordance with the embodiment of the present invention.

Now, referring to FIG. 17, the network transmits the access control information to the relay UE through the SIB (S1701). At this time, the access control information may indicate that the EAB related access control information is applied even in the indirect mode and the CSFB related access control information is not applied in the indirect mode. The relay UE which has received the access control information again transmits the access control information to the remote UE (S1703).

Afterwards, data are generated by the remote UE, and it is assumed that the generated data are voice call related data (S1705). The remote UE recognizes that the data generated in the step S1705 are voice call related data, and checks whether an access control is required for a voice all. That is, the remote UE checks the access control information received in the step S1703. Since the corresponding access control information indicates that the CSFB related access control information is not applied in the indirect mode, the remote UE skips the access control check and performs additional operations for voice call connection (S1707).

Afterwards, if IoT data are generated by the remote UE (S1709), the remote UE checks whether EAB access control should be applied to the generated IoT data (S1711). That is, if the remote UE checks that EAB access control is applied in the indirect mode by checking the received access control information, the remote UE performs an access control check. In accordance with the checked result, if it is determined that transmission of the data is allowed, the remote UE may transmit the data to the eNB. On the contrary, as a result of the checked result, if it is determined that transmission of the data is not allowed, the remote UE does not transmit the data to the eNB.

At this time, as described in the embodiment 1, the remote UE may operate the timer according to the data, and may again perform the check per certain time interval. If transmission of the data is not allowed until the timer expires, the remote UE may delete the data. Also, the access control information used when the check is performed again may be the access control information received in the step S1703, but the check may be performed again based on the access control information updated from the relay UE at a random time after the step S1703, that is, the latest access control information.

In the description related to FIG. 17, the access control information is selectively applied in accordance with information as to whether access control information of the remote UE which is in the indirect mode is applied in the indirect mode per access control type. Currently, it is expected that the spread of IoT services is expanded and IoT UEs/services more than smartphones as much as ten times will be spread in the future. Also, IoT services have the amount of data less than services such as voice or Internet browsing, and are not susceptible to transfer latency. Therefore, if a radio network is lack of system resources, a provider may desire to restrict an access attempt generated by an IoT UE/service and allow an access for an important service such as voice service if possible by applying more access control if possible to the corresponding IoT UE/service. Similarly, a network provider may desire to allow a voice service if possible and control an access for IoT related services more strictly even though the UE is in the indirect mode. In this case, notification as to application of an access control per access control information in the indirect mode may assist differentiation of such services.

Meanwhile, in the embodiment described with reference to FIG. 17, the access control check performed in the steps S1707 and S1711 may be performed by the relay UE. That is, the remote UE transmits the generated data to the relay UE regardless of a type of the data. Then, the relay UE checks whether an access control of the received data is required, based on the access control information received from the eNB. For example, if the received data are voice call related data and the corresponding access control information indicates that the CSFB related access control information is not applied in the indirect mode, the relay UE may skip the access control check.

However, if the data received from the remote UE are IoT data and the access control information indicates that EAB access control is applied, the relay UE may perform the access control check for the IoT data.

In this case, the step S1703 may be skipped. That is, the operation similar to that of the aforementioned embodiment 1 related to FIG. 15 may be performed.

Meanwhile, if the UE in the indirect mode fails to directly receive access control information through SIB transmitted from the cell, the relay UE should transfer the access control information received from the cell to the UE of the indirect mode. However, to transfer the access control information, since the relay UE should radio resources and battery, if there are a lot of kinds of access control information to be transmitted from the relay UE to the remote UE, it means that more radio resources within the corresponding eNB and more batteries of the relay UE should additionally be used. Additional use of the radio resources may reduce transmission throughput of the overall cell and reduce a possible standby time of the relay UE.

However, when the relay UE transmits the access control information received from the eNB to the remote UE, the relay UE may selectively transfer only information applied to the remote UE without transferring all kinds of information included in the access control information to the remote UE.

This will be described in detail with reference to FIG. 18. The network transmits the access control information to relay UEs through the SIB (S1801). At this time, the access control information may indicate that the EAB related access control information is applied even in the indirect mode and the CSFB related access control information is not applied in the indirect mode. The relay UE selects information on an access control scheme applied in the indirect mode, from each information included in the access control information, to determine information applied to the indirect mode or the remote UE from the information included in the access control information received from the network (S1803). Afterwards, the relay UE transfers only the access control information on the selected access control scheme to the remote UE (S1805). That is, the relay UE transfers only the EAB related access control information applied in the indirect mode to the remote UE and does not transfer the CSFB related access control information which is not applied in the indirect mode, to the remote UE.

Figure 19:
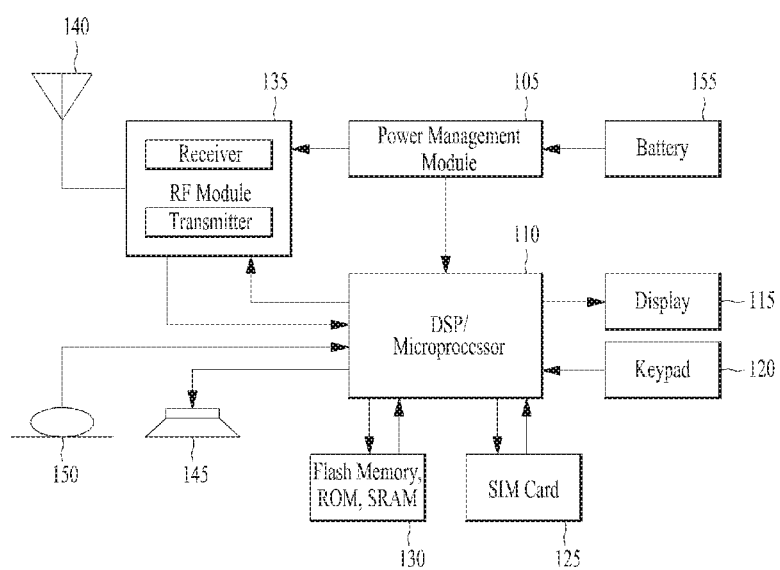
FIG. 19 is a block diagram of a communication apparatus according to an embodiment of the present invention.

FIG. 19 is a block diagram of a communication apparatus according to an embodiment of the present invention.

The apparatus shown in FIG. 19 can be a user equipment (UE) and/or eNB adapted to perform the above mechanism, but it can be any apparatus for performing the same operation.

As shown in FIG. 19, the apparatus may comprises a DSP/microprocessor 110 and RF module (transceiver) 135. The DSP/microprocessor 110 is electrically connected with the transceiver 135 and controls it. The apparatus may further include power management module 105, battery 155, display 115, keypad 120, SIM card 125, memory device 130, speaker 145 and input device 150, based on its implementation and designer's choice.

Specifically, FIG. 19 may represent a UE comprising a receiver 135 configured to receive a request message from a network, and a transmitter 135 configured to transmit the transmission or reception timing information to the network. These receiver and the transmitter can constitute the transceiver 135. The UE further comprises a processor 110 connected to the transceiver (receiver and transmitter) 135.

According to the embodiment of the present invention, the communication apparatus described in FIG. 19 may be a remote UE or a relay UE.

If the communication apparatus of FIG. 19 is a remote UE, the microprocessor 110 receives access control information through the relay UE by controlling the RF module 135. At this time, the access control information may indicate that EAB related access control information is applied even in an indirect mode and CSFB related access control information is not applied in the indirect mode. Afterwards, if data generated by the remote UE are data to which an EAB control scheme is applied, the remote UE may block data transmission or transmit data by performing an access control check. On the contrary, if data generated by the remote UE are data to which a CSFB related control scheme is applied, the remote UE may transmit the data to the relay UE without performing an access control check, that is, by skipping an access control check step. Also, the procedures of the embodiments 1 to 6 may be performed under the control of the microprocessor 110.

Similarly, if the communication apparatus of FIG. 19 is a relay UE, the microprocessor 110 receives access control information from the eNB by controlling the RF module 135. At this time, the access control information may indicate that EAB related access control information is applied even in an indirect mode and CSFB related access control information is not applied in the indirect mode. Afterwards, if user data are received from the remote UE, the relay UE may perform an access control check for the user data based on the access control information if the user data are data to which a first access control scheme allowed in an indirect connection mode is applied, and may transmit the user data to the eNB without performing the access control check for the user data if the user data are data to which a second access control scheme which is not allowed in the indirect connection mode is applied. Also, the procedures of the embodiments 1 to 6 may be performed under the control of the microprocessor 110.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of transmitting and receiving data between an eNB and a remote UE by utilizing D2D communication is explained centering on an example applied to 3GPP LTE system, the method can be applied to various wireless communication systems in addition to 3GPP LTE system.

What is claimed is:
1. An access control method of a first UE for transmitting user data to a network through a second UE in a wireless communication system, the method comprising:
receiving access control information through the second UE; and
determining, on the basis of the access control information, whether to perform an access control check for the user data depending on whether the user data are data to which an access control scheme allowed in an indirect connection mode is applied,
wherein the access control information includes information on an access control scheme which is allowed or not allowed in the indirect connection mode, and
wherein, based on the user data are data to which an access control scheme which is not allowed in the indirect connection mode is applied, the user data are transmitted to the second UE without the access control check for the user data.

2. The method of claim 1, wherein, if the first UE is connected with the network by a direct connection mode, the access control check is performed regardless of an access control scheme applied to the user data.

3. The method of claim 1, wherein further comprising performing the access control check for the user data if the user data are data to which an access control scheme allowed in the indirect connection mode is applied, and transmitting the user data to the second UE if it is determined that transmission of the user data is allowed.

4. The method of claim 3, wherein, if it is determined, by the access control check, that transmission of the user data is not allowed, a timer corresponding to the user data operates, and the access control check is performed again per certain time interval and the user data are deleted if transmission of the user data is not allowed until the timer expires.

5. An access control method of a second UE for transmitting user data of a first UE to a network in a wireless communication system, the method comprising:
receiving access control information from the network;
receiving the user data from the first UE; and
determining, on the basis of the access control information, whether to perform an access control check for the user data depending on whether the user data are data to which an access control scheme allowed in an indirect connection mode is applied,
wherein the access control information includes information on an access control scheme which is allowed or not allowed in the indirect connection mode, and
wherein, based on the user data are data to which an access control scheme which is not allowed in the indirect connection mode is applied, the user data are transmitted to the second UE without the access control check for the user data.

6. The method of claim 5, wherein further comprising performing the access control check for the user data if the user data are data to which an access control scheme allowed in the indirect connection mode is applied, and transmitting the user data to the network if it is determined that transmission of the user data is allowed.

7. The method of claim 6, wherein, if it is determined, by the access control check, that transmission of the user data is not allowed, the first UE is requested to suspend transmission of the user data.

8. The method of claim 7, wherein, if updated access control information is received from the network, the access control check for the user data is performed based on the updated access control information, and if it is determined, by the access control check, to transmit the user data to the network, the first UE is requested to resume transmission of the user data.

9. The method of claim 6, wherein, if it is determined, by the access control check, that transmission of the user data is not allowed, a timer corresponding to the user data operates, and the access control check is performed again per certain time interval and the user data are deleted if transmission of the user data is not allowed until the timer expires.

10. A first UE for transmitting user data to a network through a second UE in a wireless communication system, the first UE comprising:
a radio frequency (RF) unit comprising a transceiver; and
a processor configured to control the RF unit,
wherein the processor is configured to receive access control information through the second UE and determine, on the basis of the access control information, whether to perform an access control check for the user data depending on whether the user data are data to which an access control scheme allowed in an indirect connection mode is applied, and
wherein the access control information includes information on an access control scheme which is allowed or not allowed in the indirect connection mode, and
wherein, based on the user data are data to which an access control scheme which is not allowed in the indirect connection mode is applied, the user data are transmitted to the second UE without the access control check for the user data.

11. A second UE for transmitting user data of a first UE to a network in a wireless communication system, the second UE comprising:
a radio frequency (RF) unit comprising a transceiver; and
a processor configured to control the RF unit,
wherein the processor is configured to receive access control information from the network by controlling the RF unit, receive the user data from the first UE, and determine, on the basis of the access control information, whether to perform an access control check for the user data depending on whether the user data are data to which an access control scheme allowed in an indirect connection mode is applied, and
wherein the access control information includes information on an access control scheme which is allowed or not allowed in the indirect connection mode, and
wherein, based on the user data are data to which an access control scheme which is not allowed in the indirect connection mode is applied, the user data are transmitted to the second UE without the access control check for the user data.

* * * * *